United States Patent
Weber et al.

(10) Patent No.: US 10,578,127 B2
(45) Date of Patent: Mar. 3, 2020

(54) VANE RING, INNER RING, AND TURBOMACHINE

(71) Applicant: MTU Aero Engines AG, Muechen (DE)

(72) Inventors: Julian Weber, Munich (DE); Alexander Griesmair, Munich (DE)

(73) Assignee: MTU Aero Engines AG, Munich (DE)

(*) Notice: Subject to any disclaimer, the term of this patent is extended or adjusted under 35 U.S.C. 154(b) by 515 days.

(21) Appl. No.: 15/327,134

(22) PCT Filed: Mar. 18, 2015

(86) PCT No.: PCT/DE2015/000126
§ 371 (c)(1),
(2) Date: May 15, 2017

(87) PCT Pub. No.: WO2015/149732
PCT Pub. Date: Oct. 8, 2015

(65) Prior Publication Data
US 2017/0268532 A1     Sep. 21, 2017

(30) Foreign Application Priority Data

Mar. 31, 2014 (DE) .................. 10 2014 205 986

(51) Int. Cl.
| | | |
|---|---|---|
| *F01D 11/00* | (2006.01) | |
| *F04D 29/56* | (2006.01) | |
| *F01D 17/16* | (2006.01) | |
| *F01D 1/02* | (2006.01) | |
| *F01D 7/00* | (2006.01) | |
| *F01D 9/04* | (2006.01) | |
| *F01D 25/16* | (2006.01) | |

(Continued)

(52) U.S. Cl.
CPC ............ *F04D 29/563* (2013.01); *F01D 1/02* (2013.01); *F01D 7/00* (2013.01); *F01D 9/041* (2013.01); *F01D 17/162* (2013.01); *F01D 25/16* (2013.01); *F04D 29/083* (2013.01); *F04D 29/321* (2013.01); *F05D 2220/30* (2013.01); *F05D 2220/32* (2013.01); *F05D 2230/90* (2013.01); *F05D 2240/12* (2013.01); *F05D 2240/56* (2013.01); *Y02T 50/671* (2013.01)

(58) Field of Classification Search
CPC . F01D 5/20; F01D 11/02; F01D 11/08; F04D 29/08; F04D 29/10; F05D 2240/11
USPC ......... 415/170.1, 173.1, 173.3, 173.6, 174.1, 415/174.2, 174.5; 277/355, 357, 359
See application file for complete search history.

(56) References Cited

U.S. PATENT DOCUMENTS 3,314,654 A    4/1967  Spencer et al.
4,314,791 A    2/1982  Weiler
(Continued)

FOREIGN PATENT DOCUMENTS

DE    2810240 A1    11/1979
DE    69900004 T2    3/2001
(Continued)

*Primary Examiner* — John Kwon
(74) *Attorney, Agent, or Firm* — Davidson, Davidson & Kappel, LLC

(57) ABSTRACT

Described is an adjustable guide vane ring of a turbomachine having an inner ring which is split radially and mounted axially together, on which a brush seal is configured, an inner ring for a guide vane ring of this kind, as well as a turbomachine.

10 Claims, 2 Drawing Sheets

(51) Int. Cl.
*F04D 29/08* (2006.01)
*F04D 29/32* (2006.01)

(56) References Cited

U.S. PATENT DOCUMENTS

| | | | |
|---|---|---|---|
| 4,721,434 A * | 1/1988 | Marshall | F01D 5/16 |
| | | | 415/119 |
| 4,834,613 A | 5/1989 | Hansen et al. | |
| 4,990,056 A | 2/1991 | McClain et al. | |
| 5,421,703 A | 6/1995 | Payling | |
| 6,129,512 A | 10/2000 | Agram et al. | |
| 6,435,820 B1 * | 8/2002 | Overberg | F01D 25/246 |
| | | | 415/1 |
| 7,600,967 B2 * | 10/2009 | Pezzetti, Jr. | F01D 11/005 |
| | | | 415/115 |
| 7,854,586 B2 * | 12/2010 | Major | F01D 11/001 |
| | | | 415/160 |
| 10,364,827 B2 | 7/2019 | Humhauser et al. | |
| 2003/0113204 A1 | 6/2003 | Wolf | |
| 2006/0005696 A1 | 1/2006 | Glisenti et al. | |
| 2006/0056963 A1 | 3/2006 | Abadie et al. | |
| 2006/0110246 A1 | 5/2006 | Bruce et al. | |
| 2007/0020091 A1 | 1/2007 | Giaimo et al. | |
| 2007/0160464 A1 | 7/2007 | Lesnevsky et al. | |
| 2007/0297897 A1 * | 12/2007 | Tran | F01D 11/001 |
| | | | 415/170.1 |
| 2008/0219832 A1 | 9/2008 | Major et al. | |
| 2010/0232952 A1 | 9/2010 | Stiehler | |
| 2010/0247294 A1 * | 9/2010 | Bowes | F01D 11/001 |
| | | | 415/170.1 |
| 2011/0265328 A1 | 11/2011 | Stiehler | |
| 2012/0000935 A1 | 1/2012 | Brunk et al. | |
| 2012/0026357 A1 | 2/2012 | Katagairi et al. | |
| 2012/0263571 A1 | 10/2012 | Ress, Jr. | |
| 2014/0044526 A1 | 2/2014 | Humhauser | |

FOREIGN PATENT DOCUMENTS

| | | |
|---|---|---|
| DE | 10225679 A1 | 12/2003 |
| DE | 102006024085 A1 | 11/2007 |
| DE | 102009004934 A1 | 8/2010 |
| DE | 102009038623 A1 | 3/2011 |
| EP | 0298894 A1 | 1/1989 |
| EP | 1312764 A2 | 5/2003 |
| EP | 1319844 B1 | 6/2003 |
| EP | 2696041 A1 | 2/2014 |
| GB | 1049080 A | 11/1966 |

* cited by examiner

VANE RING, INNER RING, AND TURBOMACHINE

The present invention relates to an adjustable guide vane ring for a turbomachine according to the definition of the species set forth in claim 1, an inner ring for an adjustable guide vane ring, as well as to a turbomachine.

BACKGROUND

To set optimal operating conditions, turbomachines, such as aircraft engines and stationary gas turbines, normally have at least one compressor-side, adjustable guide vane row having a plurality of guide vanes that are pivotably mounted about the vertical axis thereof. Together with an inner ring, the guide vane row forms what is generally referred to as an adjustable guide vane ring. The inner ring is used for stabilizing the guide vanes and has a plurality of radial openings or recesses for receiving an airfoil-side pivot pin in each instance. The guide vanes are externally supported and actuated by adjusting pins thereof, that can cooperate with a corresponding adjusting device. Bearing bushings, in which the pivot pins are positioned, are inserted in the openings or recesses of the inner ring. The German Patent Application DE 102006024085 A1 discusses forming the inner ring from two semicircular ring segments and for rolling these individually onto the pivot pin of the guide vanes installed in the housing halves. To this end, the ring segments are pretensioned to a constant clamping radius, positioned in the region of the bearing pins, and then stress-relieved. Once the semicircular ring segments are rolled on, a seal carrier is slid onto the same. The inner ring, respectively the guide vane ring is dismantled analogously. The inner ring segments may be deformed and positioned by a clamping device described in the German Patent Application DE 102009004934 A1.

The European Patent EP 1319844 B1 describes an inner ring for an adjustable guide vane ring that is split radially and mounted axially together, and thus, viewed in the direction of a primary flow, has a front ring segment and a rear ring segment. Radial recesses for receiving bearing bushings and, thus, the pivot pins are each formed by one half in ring segments that are detachably interconnected via screw-and-nut connections configured between the recesses.

The German Patent Document DE 699 00 004 T2 describes an adjustable guide vane ring, whose inner ring is composed of two semicircular ring segments and on which, radially inwardly, a readily abradable material is provided as a sealing segment into which the rotor-side sealing webs can run. A labyrinth seal is hereby provided, which, in fact, fundamentally makes possible a high degree of sealing. However, the sealing webs are able to rub irreversible gaps into the sealing segment that permanently increase leakage.

BACKGROUND

It is an object of the present invention to provide an adjustable guide vane ring for a turbomachine that will make it possible to reduce amounts of circulating air leakage. It is also an alternate or additional object of the present invention to provide a compact inner ring for a guide vane ring of this kind. It is also an alternate or additional object of the present invention to provide a turbomachine that has a high compressor efficiency.

An inventive adjustable guide vane ring of a turbomachine has a plurality of guide vanes forming a guide vane row and an inner ring for stabilizing the guide vane row. The guide vanes each have an adjusting pin, which is disposed radially outwardly relative to a longitudinal axis of the ring and is provided for cooperating with an adjusting device. The inner ring is split radially and mounted axially together and, viewed in the direction of a primary flow, has a front ring segment and a rear ring segment. In accordance with the present invention, the inner ring bears a brush seal for sealing a gap between the inner ring and an opposite rotor portion.

Providing a brush seal in accordance with the present invention reduces the amount of circulating air leakage since the brush seal is not able to rub gaps into the opposite rotor portion, nor is the opposite rotor portion able to rub gaps into the brush seal. The brushes, respectively the brush portion of the brush seal, deform(s) elastically in response to a relative movement of the rotor toward the stator, so that no plastic gaps remain even after a substantial relative movement. In addition, the number of required components is reduced since the need is eliminated for rotor-side sealing webs, as well as for the antiwear coating thereof, for example. Moreover, weight is economized due to the reduced number of components required for the brush seal. The brush seal is preferably radially oriented. However, it may also be axially or diagonally oriented relative to the longitudinal axis of the ring. The opposite rotor portion is to be oriented as a function of the orientation of the brush seal, respectively the brush portion thereof.

In one exemplary embodiment, the brush seal is configured with the holding portion thereof in a receiving space between the ring segments that is bounded by the two ring segments. Thus, when the ring segments are installed, the brush seal is simultaneously fixed in position. Functions are integrated, simplifying installation and thereby leading to a cost saving.

In one preferred exemplary embodiment, the brush seal is passed by the brush portion thereof through a leadthrough region out of the receiving space that is wider than the brush portion in the leadthrough region. This enhances the flexibility of the brush seal since the brush portion has a considerable free length. Thus, it is able to deform elastically, starting with the holding portion.

The brush portion preferably rests against the front ring segment. This measure makes possible an exact neutral position, as well as an operating position, as well as a visual control of the installation position.

Installation of the brush seal may be simplified when it is composed of ring element parts. It is preferably composed of two ring element halves, respectively ring element parts, which each span an angle of 180°, respectively whose parting plane is identical to a circumferential parting plane of the inner ring. This makes it convenient to install the brush seal, together with the inner ring, in housing halves of a turbomachine. This type of construction may also analogously feature a segmented design. For example, the brush seal may be composed of three, four or more ring element parts or be a slotted spring ring.

The ring segments of the inner ring may be connected by bolted or riveted connections, for example. Both connection types permit a load-bearing connection of the ring segments and thus also a load-bearing positioning of the brush seal. The bolted or riveted connection secures the brush seal radially by a form-locking engagement and, circumferentially, by a frictional engagement. The ring segments are preferably riveted to one another since less outlay is required for a riveted connection than for a bolted connection. Nevertheless, in addition to a frictional connection and/or a form-locking connection, a material-to-material bond or a frictional engagement may also be suitable types of connection. For example, in machine areas having a reduced temperature, such as in the compressor areas, it is fundamentally conceivable to bond the ring segments to one another.

In one exemplary embodiment, the ring segments are manufactured differently. For example, the front ring segment is a forged part, while the rear ring segment is a reshaped sheet-metal section. Likewise conceivable is a combination of a forged part with a sheet-metal section. The different manufacturing advantageously permits a weight optimization since the ring segments may be optimized in accordance with the thermal, mechanical and chemical stresses thereof.

A vane plate is preferably used to position the guide vanes in the inner ring. Thus, radially inwardly, the guide vanes are pivot pin-free. Omitting the pivot pin and thus also the bearing bushings and, instead, directly supporting the guide vanes via the vane plates thereof in the inner ring, make it possible for the inner ring to be formed at a reduced height in comparison to the known inner rings, making possible a use in small compressors. Because the number of parts is reduced, it is also possible to reduce losses due to leakage, decrease the weight and the costs of the guide vane ring. By omitting the pivot pins and the bearing bushings, a radial installation space is achieved that permits an optimal orientation and positioning of the brush seal. In and of itself, the enlarged installation space makes it possible to select the brush seal that will have the optimal properties for the particular turbomachine. The connecting elements, such as screws and rivets, may thereby be configured to be easily accessible and, therefore, permit an easy assembly.

A preferred inner ring for a guide vane ring according to the present invention has a brush seal for sealing a gap between the inner ring and an opposite rotor portion. An inner ring of this kind is distinguished by a compact and weight-saving type of construction. The inner ring according to the present invention fulfills two important functions. On the one hand, it supports the guide vanes radially inwardly. On the other hand, it forms a receiving space for the brush seal and thus for the entire inner air seal[1], since the need for rotor-side sealing webs is eliminated. Thus, the inner air seal is completely integrated in the inner ring. In contrast to conventional inner rings having a honeycomb seal that is able to be slid on circumferentially, the function of the inner air seal is integrated in the inner ring.

A preferred turbomachine has at least one guide vane ring that is adjustable in accordance with the present invention. It has a brush seal for sealing a gap between the inner ring and an opposite rotor portion. This makes a high compressor efficiency attainable since amounts of circulating air leakage in the area of the guide vane ring are reduced.

BRIEF DESCRIPTION OF THE DRAWINGS

A preferred exemplary embodiment of the present invention is described in greater detail below with reference to schematic representations. In the drawing.

DETAILED DESCRIPTION

Figure 1:
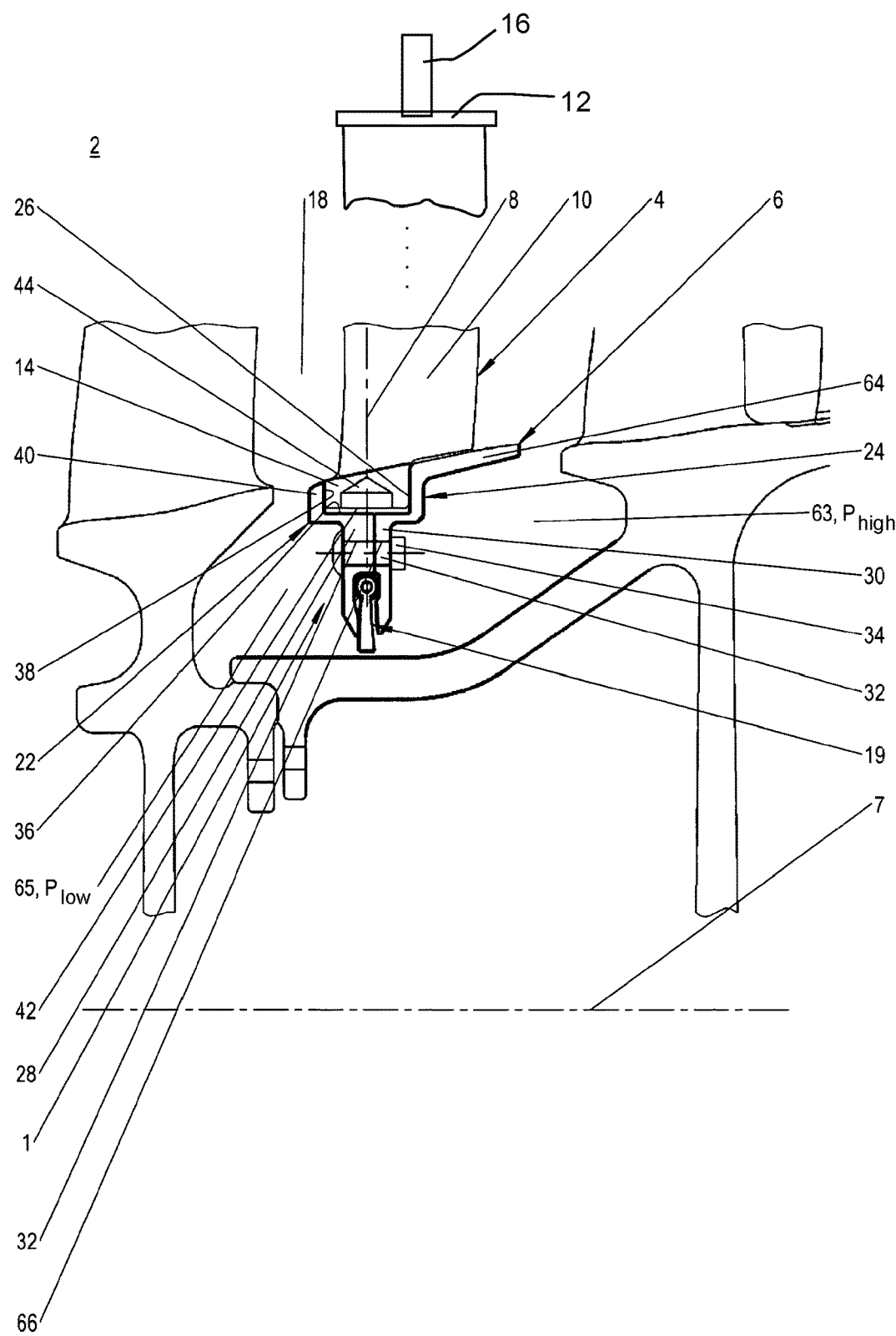
FIG. 1 shows a longitudinal section through a turbomachine in the area of a guide vane ring that is adjustable in accordance with the present invention.

In accordance with the representation in FIG. 1, an inventive guide vane ring 1 of a turbomachine 2, for example, an aircraft engine, has a plurality of guide vanes 4 and an inner ring 6. Guide vane ring 1 is configured on the compressor side and has 320 guide vanes 4, for example. It is oriented in turbomachine 2 in a way that allows it to reside with the longitudinal ring axis thereof on a longitudinal rotor axis 7, respectively longitudinal axis of turbomachine 2.

Guide vanes 4 form a guide vane row and are adjustable about vertical axis 8 thereof that extends radially to the longitudinal ring axis and is indicated by dash-dot line. They each have an airfoil 10, an outer vane plate, an inner vane plate 14, as well as an outer adjusting pin. Vane plates 12, 14 have a circumference and, together with the opposite plate surfaces (not denoted here) thereof are used for radially bounding an annular space 18 that receives airfoils 10. During operation of the turbomachine, annular space 18 is traversed by a primary flow from left to right in the illustrated exemplary embodiment. Here, the primary flow is an air flow to be compressed. Relative to longitudinal ring axis, respectively longitudinal turbomachine axis, adjusting pins 16 extend radially outwardly on the reverse side from outer vane plates 12 and cooperate with an adjusting device outside of annular space 18. Guide vanes 4 do not have any pivot pins designed for the radial inner bearings and thus, radially inwardly, are pivot pin-free. Guide vanes 4 are inwardly supported via inner vane plates 14 thereof directly in cooperation with inner ring 6. Omitting the pivot pin and thus also bearing bushings and, instead, configuring the guide vanes to be directly supported via the vane plates thereof in the inner ring, makes it possible for a brush seal 19 (to be described in greater detail below) to be mounted in accordance with the present invention since inner ring 6 requires less installation space than a conventional inner ring 6.

Inner ring 6 extends around a rotor portion 20 of turbomachine 1 and is radially spaced apart therefrom. It is used for stabilizing guide vanes 4 radially inwardly. It is split radially and mounted axially together, and thus, viewed in the direction of the primary flow, has an upstream or front ring segment 22 and downstream or rear ring segment 24. Inner ring 6 has a plurality of bearing recesses 26 that are uniformly mutually spaced apart in the circumferential direction and are partially configured in front ring segment 22 and rear ring segment 24.

In the exemplary embodiment shown here, ring segments 22, 24 are forged parts. However, it is also conceivable for ring segments 22, 24 to be designed as components that are manufactured in different ways. Thus, for example, the one ring segment 22 may be in the form of a forged part or a cast part, and the other ring segment 24 in the form of a sheet-metal part or sheet-metal section. In the installed state, ring segments 22, 24 are closed over the periphery thereof and thus span an angle of 360°. To install, respectively form inner ring 4, each has a radially inner flange 28, 30, respectively flange ring that is radially inner relative to bearing recesses 26, into which a plurality of axial flange boreholes 32 are introduced for receiving a connecting element 34 in each case. Exemplary connecting elements are screws, threaded bolts and rivets whose heads or nuts may be additionally countersunk in a conical extension of particular flange 28, 30.

Bearing recesses 26 are formed by one half in ring segments 22, 24. They are used for receiving inner vane plates 14 and, together with these, each form a radial inner bearing location. They each have a bottom surface 36 and an inner circumferential surface 38. Due to the preferred half configuration, each ring segment 22, 24 thereby forms a circumferential angle of 180°. Inner circumferential surfaces 38 of bearing recesses 26 act as bearing surfaces and may be provided with a corresponding anti-friction coating.

Inner vane plates 14 each have an outer circumferential surface 40. They form corresponding bearing surfaces. In the installed state, they are in sliding contact with inner circumferential surfaces 38 of bearing recesses 26. Outer circumferential surfaces 40 of inner blade plates 14 are preferably likewise provided with an anti-friction coating. To reduce weight, a radially extending hollow space 44 is introduced into an end face 42 of inner vane plates 14 that faces bottom surface 36. Hollow space 44 is a blind hole, for example.

Figure 2:
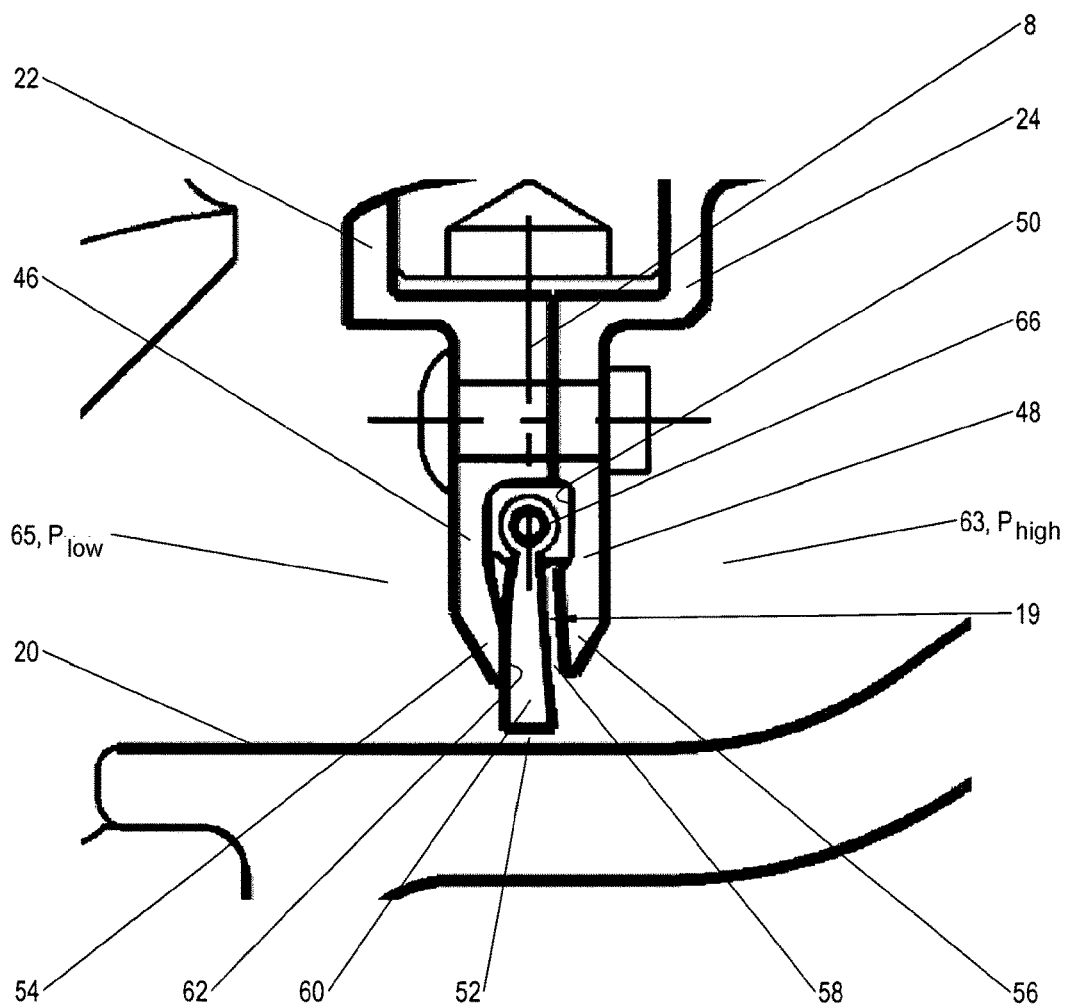
FIG. 2 is a detail view from FIG. 1.

A detail view in FIG. 2 reveals that ring segments 22, 24 are extended in each case radially inwardly beyond the riveted connection shown here. For this purpose, they each feature a radial extension 46, 48 between which a receiving space 50 is formed in which brush seal 19 is inserted to reduce a gap 52 with rotor portion 20.

Thus, extensions 46, 48 are mutually spaced apart axially, and are mutually oriented to allow brush seal 19, respectively brush portion 60 thereof to reside centrally on vertical axes 8 of particular guide vanes 4, in the radial orientation. Extensions 46, 48 have approximately the same radial extent and thus approximately the same distance from opposite rotor portion 20. End portions 54, 56 thereof are oriented toward one another, so that, in the illustrated sectional view, extensions 46, 48 act in a clawlike manner.

End portions 54, 56 are thereby mutually spaced apart in a way that forms a leadthrough region 58 for passing through brush seal 19 that is wider than brush portion 60 of brush seal 19. Together with surface 62 thereof facing brush seal 19, the thereby front extension 46 forms a contact face for brush portion 60 in the neutral position and the operating position. Here, brush portion 60 has an axial width that allows it to be axially spaced apart from rear extension 48. During operation, a high pressure $P_{high}$ prevails in a cavity 63 radially inwardly of a platform projection 64 or rear ring segment 24 bounding annular space 18, whereas a low pressure $P_{low}$ prevails in a front ring segment-side cavity 65. The pressure differential presses brush portion 60 in operation against front extension 46, brush portion 60 reduces or completely suppresses the formation of a secondary flow through gap 52 joining cavities 63, 65 oppositely to the primary flow in annular space 18.

Brush seal 19 and, in particular, brush portion 60 thereof is radially oriented and securely clamped by holding portion 66 thereof in receiving space 50 between extensions 46, 48 via the riveted connection. It is passed by elastically deformable brush portion 60 thereof out of receiving space 50 through leadthrough region 58 and thereby reduces gap 52. Brush portion 60 is clamped in holding portion 66 and widened on both sides in a wedge shape toward the unattached end thereof. Brush seal 19 preferably has two half ring elements, which each span an angle of 180° and thereby reside by circumferential parting plane thereof in the parting plane of inner ring 6.

For the installation, brush seal 19, respectively the ring elements thereof are preferably inserted in the rounded state into receiving space 50 between ring segments 22, 24 and then radially secured by connection of the two ring segments 22, 24 by a form-locking engagement and, circumferentially, by a frictional engagement.

Upon running of rotor portion 20 up against brush portion 60 in response to a movement of the rotor relative to the stator, brush portion 60 deforms elastically. After returning to an original position thereof, brush portion 60 again assumes the original neutral position thereof. At or beyond a specific relative movement, brush portion 60 runs up against the surface of rear extension 48 facing brush portion 60 and the resilience thereof hardens.

Described is an adjustable guide vane ring of a turbomachine having an inner ring which is split radially and mounted axially together, on which a brush seal is configured, an inner ring for a guide vane ring of this kind, as well as a turbomachine.

REFERENCE NUMERAL LIST 1 guide vane ring
2 turbomachine
4 guide vanes
6 inner ring
7 longitudinal rotor axis
8 vertical axis
10 airfoil
12 vane plates
14 inner vane plate
16 adjusting pins
18 annular space
19 brush seal
20 rotor portion
22 front ring segment
24 rear ring segment
26 bearing recess
28 flange
30 flange
32 flange bore
34 connecting element
36 bottom surface
38 inner circumferential surface
40 outer circumferential surface
42 end face
44 hollow space
46 extension
48 extension
50 receiving space
52 gap
54 end portion
56 end portion
58 leadthrough region
60 brush portion
62 surface/contact face
63 cavity
64 platform projection
65 cavity
66 holding portion
$P_{high}$ pressure prevailing in cavity 63
$P_{low}$ pressure prevailing in cavity 65

What is claimed is:

1. An adjustable guide vane ring of a turbomachine, the adjustable guide vane ring comprising:
    a plurality of guide vanes forming a guide vane row and an inner ring for stabilizing the guide vane row, the guide vanes each having an adjusting pin disposed radially outwardly relative to a longitudinal axis of the ring, for cooperating with an adjusting device, the inner ring being split radially and mounted axially together, viewed in the direction of a primary flow, having a front ring segment and a rear ring segment; and
    a brush seal positioned on the inner ring for sealing a gap between the inner ring and an opposite rotor portion.

2. The adjustable guide vane ring as recited in claim 1 wherein the brush seal is configured with a holding portion thereof in a receiving space between the front and rear ring segments, the receiving space being bounded by the front and rear ring segments.

3. The adjustable guide vane ring as recited in claim 2 wherein
the brush seal is passed by a brush portion thereof through a leadthrough region out of the receiving space, the receiving space being wider than the brush portion in the leadthrough region.

4. The adjustable guide vane ring as recited in claim 3 wherein the brush seal, at the brush portion thereof, is contiguous to the front ring segment.

5. The adjustable guide vane ring as recited in claim 1 wherein the brush seal includes ring element parts.

6. The adjustable guide vane ring as recited in claim 1 wherein the front and rear ring segments are bolted or riveted to one another.

7. The adjustable guide vane ring as recited in claim 1 wherein the front and rear ring segments are manufactured in different ways.

8. The adjustable guide vane ring as recited in claim 1 further comprising a vane plate for positioning the guide vanes in the inner ring.

9. An inner ring for an adjustable guide vane ring as recited in claim 1, the inner ring being axially split and, viewed in the direction of a primary flow, comprising the front ring segment and the rear ring segment.

10. A turbomachine comprising the adjustable guide vane ring as recited in claim 1.

* * * * *